United States Patent [19]

Fickenscher et al.

[11] 4,010,381
[45] Mar. 1, 1977

[54] NO-BREAK AC POWER SUPPLY

[75] Inventors: Hermann Fickenscher, Morristown; Rudolph Scuderi, Mountain Lakes, both of N.J.

[73] Assignee: Bell Telephone Laboratories, Incorporated, Murray Hill, N.J.

[22] Filed: Apr. 24, 1975

[21] Appl. No.: 571,092

[52] U.S. Cl. .............................................. 307/66
[51] Int. Cl.² ........................................ H02J 9/00
[58] Field of Search ................. 307/66, 64, 51, 80, 307/52; 321/4

[56] References Cited

UNITED STATES PATENTS

| | | | |
|---|---|---|---|
| 3,229,111 | 1/1966 | Schumacher et al. | 307/64 |
| 3,337,743 | 8/1967 | Rulfes | 307/66 |
| 3,339,082 | 8/1967 | Rhyne, Jr. | 307/66 |
| 3,348,060 | 10/1967 | Jamieson | 307/66 |
| 3,398,292 | 8/1968 | Kuba | 307/51 |
| 3,614,461 | 10/1971 | Speer | 307/64 |
| 3,710,133 | 1/1973 | Ferraro | 307/66 |

Primary Examiner—Herman J. Hohauser
Attorney, Agent, or Firm—Alfred G. Steinmetz

[57] ABSTRACT

An uninterruptable power supply supplies a regulated output by utilizing a ferroresonant transformer. Two independent inputs are connected to the transformer; one input is connected to a commercial AC line signal source, the other input is connected to a battery energized static inverter circuit. The AC line source normally supplies the output power. A phase control system monitors the phase of the regulated output signal and constrains the static inverter to run in phase with the output. The phase and magnitude of the AC line signal are monitored. If the magnitude of the AC line drops significantly, the static inverter is constrained to operate in phase with the AC line signal wherein the inverter and AC line both share to contribute power to the output load. If the AC line signal fails, the static inverter operates independently and supplies all of the output power to the load.

24 Claims, 4 Drawing Figures

NO-BREAK AC POWER SUPPLY

FIELD OF THE INVENTION

This invention is concerned with Uninterruptable Power Supply (UPS) systems and particularly with power supply transfer systems having a reserve energy source. It is specifically concerned with a no-break power supply system wherein an almost instantaneous transfer from a primary to a reserve energy source occurs in the event of failure or partial failure of the primary energy source. It is also specifically concerned with a no-break power supply system wherein the primary and reserve energy sources both contribute output power upon partial failure of degradation of the primary power source.

BACKGROUND OF THE INVENTION

Modern-day communication and data processing equipment circuitry utilizes solid state integrated circuit technology to transmit and control data and switching information. Circuits utilizing solid state integrated circuit technology are highly susceptible to variations in electric power from some desired standard. The power to energize these circuits can be readily derived from commercial AC power. The signal consistency of commercial AC power, however, is unreliable due to user demand and other extraneous considerations causing power level fluctuations. These signal variations can take the form of blackouts, brownouts, or transient interruptions or surges. A blackout is a condition in which the power source fails completely. A brownout is a substandard signal condition wherein the output voltage of the power source is significantly reduced. Transient interruptions and surges are conditions due to momentary disturbances which alter the continuity of the power signal supplied by the power source.

Signal variations such as described above can significantly alter stored data and switching signals in the communication equipment and may, in some instances, damage the integrated circuitry contained therein. The most dangerous failure situation is the transient interruption or surge which may cause undetected errors because the failure is not readily apparent. Erroneous data or control signals can be generated and resulting damage occur which is not immediately detectable or obvious. These transient interruptions may be due to lightning faults or the operation of heavy electrical equipment in the nearby vicinity.

As is apparent from the foregoing, communications circuitry utilizing solid state integrated circuit technology requires a very reliable power source. This circuitry generally cannot tolerate voltage excursions greater than ±10 percent for longer than a duration of approximately one-half cycle of operation. Hence, if power variations in excess of these limits are allowed to occur, it can bring about costly shutdowns, disrupted communications, erroneous computations, and possibly damaged circuitry.

To counteract the susceptibility of the communications circuitry to the above-described power signal variations, uninterruptable power supplies (UPS) are utilized. A UPS guarantees the continuity of power regardless of the performance of the primary commercial AC power source basically relied upon.

A commonly used UPS is the continuous type power supply in which a rectifier charger, powered by a primary commercial AC power source, continuously energizes a subsequent inverter circuit. The inverter operates continuously to supply output power. A battery is floated across the output of the rectifier charger to supply the necessary DC power to the inverter should the primary commercial AC power source vary significantly or fail. This continuous type UPS arrangement advantageously uses very few circuit components. However, the reliability of such a system is no greater than the reliability of the inverter circuit which must operate continuously to supply output power. In addition, such an arrangement is inefficient because the overall efficiency is no greater than the combined efficiency of the inverter and the rectifier charger, resulting in a total efficiency lower than the individual efficiency of either component.

Another type of UPS operates in a parallel continuous arrangement in which two independent sources, a primary commercial AC power source and a secondary reserve AC power source, operate continuously in parallel. These two AC signals are combined and supplied to the load continuously. Should one of the signals fail, the remaining operative source takes over to supply the full load signal to the circuitry to be energized. An example of this type of UPS is disclosed by R. E. Kuba in U.S. Pat. No. 3,398,292, issued Aug. 20, 1968. Kuba discloses a ferroresonant transformer arrangement to accept power from two discrete independent but synchronized AC power sources. The ferroresonant transformer arrangement combines the two input power signals and supplies the resultant signal to a single output load. The two input primary windings of the transformer are connected to the primary AC power source and the reserve AC power source, respectively, and are isolated from each other by high reluctance magnetic shunts. Both inputs, however, simultaneously share the output load. If one of the input power sources fails, the other input power source operates to supply the total load power. Since the two input power sources operate continuously and simultaneously, each input power source operates at less than its highest efficiency.

A more efficient UPS arrangement is the transfer type. In the transfer type arrangement, the full power to the load is normally supplied by a commercial AC power source. When the commercial AC power source is operating normally, the reserve power supply, which is usually a battery-powered static inverter, does not supply power to the load but operates in a standby mode. If the AC commercial power fails, the inverter is connected to supply the power to the load and the commercial AC power source is disconnected from the load. The power supply sources operate independently in the alternative to supply power to the load. The advantage of this system is that each power supply can be designed to operate at its maximum efficiency. In addition, there is the protection of full redundancy to cover a failure of either the primary or the reserve power source.

To supply the complete protection necessary to protect communications or data processing equipment against transient failure of the primary power source, the transfer or switching from one power source to another must be almost instantaneous and very reliable. The reserve power source must supply power to the load almost instantly upon failure of the commercial AC power source. When commercial AC power is restored, the UPS must transfer the load smoothly and rapidly from the reserve power source to the commercial AC power source.

A transfer type UPS is disclosed by R. Schumacher et al in U.S. Pat. No. 3,229,111, issued Jan. 11, 1966. Schumacher discloses an AC power system with a standby reserve power source. The output power is normally supplied from an AC commercial power source to a load. The continuity of output power is assured by a reserve power source which is maintained in a standby condition. The reserve power source comprises a battery-driven static inverter. The inverter generates a signal controlled to have a predetermined fixed phase lag with respect to the AC line signal. The fixed phase lag relationship is established so that when the commercial AC power source is functioning normally it supplies substantially all the load power requirements. If the commercial AC power signal fails, the output power is supplied by the battery-driven static inverter.

Another embodiment of a transfer type UPS is disclosed by R. S. Jamieson in U.S. Pat. No. 3,348,060, issued Oct. 17, 1967. Jamieson discloses a no-break power supply which utilizes a continuously operating standby reserve power source to back up a commercial AC power source. The standby reserve power source is synchronized in frequency and correlated in phase with the commercial AC power source. The standby reserve power source operates continuously during normal operation of the commercial AC power source. The standby reserve power source does not, however, transfer any significant power to the load during normal operation of the commercial AC power. Upon failure of the commercial AC power source the load is transferred to the standby reserve power source. The power to operate the standby reserve power source is derived from the commercial AC power source. This power is derived from a battery which is floated on a charger powered by the commercial AC power source. Should the commercial AC power fail, the inverter operates to supply the output load power.

Another transfer type UPS is disclosed by E. C. Rhyne in U.S. Pat. No. 3,339,082, issued Aug. 29, 1967. Rhyne discloses a UPS wherein a static inverter circuit and a commercial AC power source are connected in parallel to a ferroresonant system to guarantee continuous power to a load to be powered by an AC signal. As long as the commercial AC power source is functioning properly, power to the load is preferably drawn from the commercial AC power source rather than from the inverter. If the commercial AC power source fails, power to the load is supplied by the static inverter.

The above-described UPS arrangements which switch from one power source to another power source advantageously provide redundancy through transfer from a failed power source to an operating power source. These UPS arrangements, however, generally rely upon complicated transformer and static switch arrangements to transfer from one power source to another. Some of the transformer arrangements do not provide isolation between the input and output of the power supplies. In addition, they do not simultaneously permit the reserve power source or static inverter to idle losslessly when the commercial AC power source is operating normally and, further, subsequently permit the reserve power source and the commercial AC power source to operate simultaneously and to share the load power in the event of a brownout, where the commercial AC power source signal is degraded. This lack of versatility limits the maximum attainable efficiency of the power supply.

In view of the foregoing, it is desirable to have a power supply which operates from a primary or commercial AC power source and a reserve power source in which the reserve power source is power-demand responsive to supply uninterrupted power to a load. The goals of an improved UPS system are to allow highly efficient load sharing between a primary power source and a reserve power source and, upon demand, to provide almost instantaneous backup power to the commercial AC primary power source with a minimum of inverter power consumption.

BRIEF SUMMARY OF THE INVENTION

An embodiment of a UPS system of the transfer type according to the principles of the invention supplies a regulated signal through a ferroresonant transformer. Two power souce inputs are connected to the ferroresonant transformer. One input is connected to a commercial AC power line source and the other input is connected to a battery-energized static inverter power source. The commercial AC power source normally supplies the output power. A phase control system monitors the phase of the regulated output signal of the ferroresonant transformer and constrains the static inverter to run in phase with the regulated output signal. The phase and magnitude of the AC line signal is continuously monitored. If the magnitude of the AC line signal drops significantly, the static inverter is constrained to operate in phase with the commercial AC line signal wherein the inverter and the commercial AC power source both share in supplying the output power to the load. If the commercial AC power source fails completely, the static inverter runs freely and supplies all of the output power to the load.

It is apparent from the foregoing that under normal operating conditions the static inverter is run in an idling condition in phase with the output load signal. This phase control is accomplished by monitoring the phase of the output signal and controlling the signal phase of an oscillator driving the static inverter to maintain the two phases in exact coincidence. The magnitude and phase of the primary commercial AC power source is continuously monitored. If the magnitude of the primary commercial AC power source drops significantly below a particular threshold, the static inverter is run in phase with the commercial AC power source so that it may share the output power therewith. If the primary commercial AC power source fails completely, the static inverter supplies all of the output power to the load.

This no-break transfer type UPS is readily distinguishable from the above-cited UPS systems in its unique phase control arrangement which permits the static inverter to idle losslessly when the AC power line is operating normally and adjusts the phase of the static inverter to coincide with the AC power signal to permit load sharing between the primary commercial AC power source and the secondary reserve power if the commercial AC power source output should degenerate but not fail completely.

DETAILED DESCRIPTION

Figure 1:
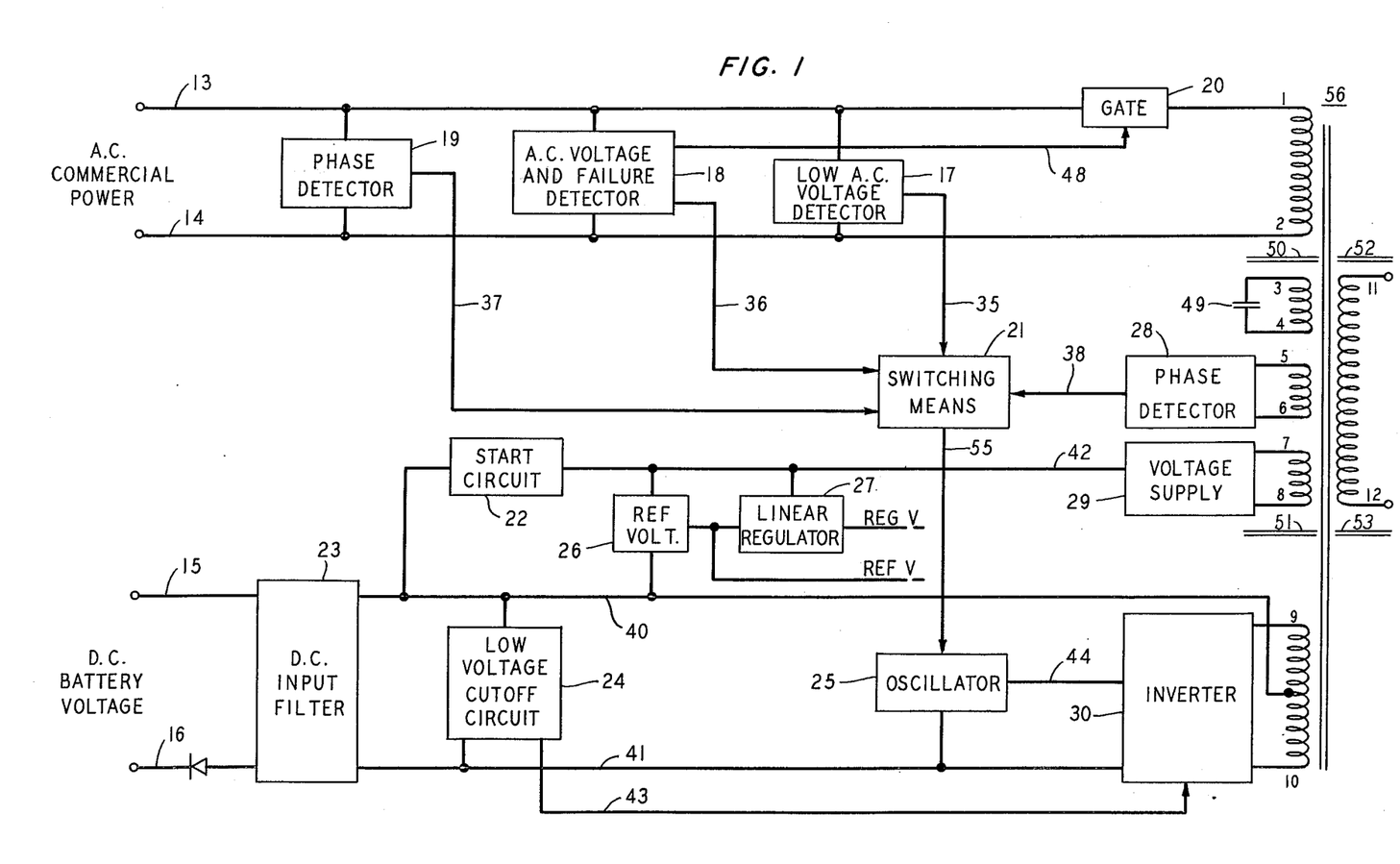
FIG. 1 is a block representation of an uninterruptable power supply embodying the principles of the invention.

An embodiment of an Uninterruptable Power Supply (UPS) incorporating the principles of the invention is shown in block form in FIG. 1. The no-break uninterruptable power supply (or UPS) disclosed therein has a first AC input to accept an AC commercial power source at input terminals 13 and 14, and a second DC input to accept a DC battery voltage source at input terminals 15 and 16. The AC and DC inputs are coupled by the control circuitry described below to a first primary winding 1-2 and a second primary winding 9-10, respectively. These first and second primary windings are wound on a ferroresonant transformer having a main saturable core 56, a secondary output winding 11-12, the first and second primary windings 1-2 and 9-10, and the high reluctance magnetic shunts 50, 51, 52, and 53. The high reluctance magnetic shunts are positioned to separate each primary winding from the output winding. These high reluctance magnetic shunts permit signals on each of the primary windings 1-2 and 9-10 to contribute power to the secondary winding 11-12 while limiting the power circulating from one primary winding to another primary winding.

The features and advantages of the no-break UPS disclosed herein may best be explained by describing the various operational modes of the UPS. Essentially the no-break UPS has three modes of operation. The first mode, or normal mode, of operation occurs when the AC commercial power signal applied to input terminals 13 and 14 is operating at its normal value without any transient interruptions. During this time interval of normal operation the inverter circuit 30 operates in a zero power drain condition which is explained hereinbelow.

The second mode of operation may be designated as the brownout, or share, mode of operation. Brownout occurs when the AC commercial power signal applied to input terminals 13 and 14 decreases in magnitude below some predetermined level but is still functioning regularly. This decrease may be transient or may exist for a significant duration of time. Generally brownout is considered to be an AC signal which is decreased in magnitude by an amount of 10 to 15 percent from its normal operative value. In this mode of operation power is still supplied to the secondary winding 11-12 from the AC commercial power source but the inverter 30 is activated and supplies power from the DC battery source connected to the terminals 15 and 16 to the output winding 11-12. During the share mode of operation the power output to the load is shared by the AC and DC power inputs applied to input terminals 13, 14 and 15, 16, respectively. Due to the design of the transformer as described above, the AC and DC power inputs each supply approximately 50 percent of the output load.

The third, or failure, mode of operation occurs when the AC commercial power supplied to the input terminals 13 and 14 fails completely. This failure may be for either a short or long interval. In the failure mode of operation the entire output power is derived from the DC battery voltage applied to input terminals 15 and 16 and inverted by inverter 30.

A critical feature of the no-break UPS is that a transition from one mode of operation to another must be made rapidly and with a minimum of distortion of the output signal on secondary winding 11-12. The no-break UPS makes a smooth and fast transition from one mode of operation to another so that distortions to the output voltage waveform on secondary winding 11-12 will have a minimum duration generally less than one-half cycle of operation of the no-break UPS.

The use of the ferroresonant transformer described herein eliminates the need for static switches to effect a transfer from one power source to another. The ferroresonant transformer is operated in the open loop ferroresonant mode. Ferroresonant action is initiated by means of the ferrocapacitor 49 shunted across winding 3-4. As described above, the high reluctance shunts 50, 51, 52, and 53 advantageously minimize the transfer of power from one primary input winding to another primary input winding. Hence it is permissible to operate the inverter 30 in an idling mode during normal operation when all the output power is supplied via the primary input winding 1-2.

During normal operation the commercial AC power source coupled to input terminals 13 and 14 is applied via a solid state gate 20 to primary winding 1-2. The gate 20 comprises a solid state relay which may include two inverse parallel connected silicon controlled rectifiers. These SCRs are triggered every half-cycle of operation in response to a signal applied to the gate 20 via lead 48. The signal on lead 48 is supplied by the AC voltage and failure detector 18. The AC voltage and failure detector 18 monitors the magnitude of the commercial AC signal applied to input terminals 13 and 14; and, when the signal is within its normal range, supplies a signal on lead 48 to trigger the SCRs in the gate 20.

During normal operation the AC voltage and failure detector 18 applies a signal to the switching means 21 to complete a path therein to couple the output signal of a phase detector 28, via leads 38 and 55, to the oscillator 25 as described below. Hence, during normal operation, the power is supplied by the commercial AC source to the input terminals 13 and 14, through the gate 20 which is triggered every half-cycle, to the primary input winding 1-2 and from thence to the secondary output winding 11-12.

The phase detector 28 is coupled to winding 5-6 and operates to detect the zero crossings of the output signal waveform which approximates a square wave and generates a square wave signal in phase therewith. This generated square wave signal is applied, via lead 38, to the switching means 21. The AC voltage and failure detector 18 applies a signal, via lead 36, to the switching means 21. The state of this signal indicates the normal operation of the AC commercial power supplied to input leads 13 and 14 and controls the coupling of the phase detector 28 to the oscillator 25. The switching means 21 may advantageously comprise a semiconductor bilateral switch. A suitable bilateral switch for this purpose is disclosed in the RCA Solid State Data Book Series, "Cosmos Digital Integrated Circuits" on pages 78-83.

The internal switching paths of the switching means 21 complete a connection from lead 38 which has a signal in phase with the output signal, via lead 55, to the oscillator 25. The oscillator 25 is constrained to operate in phase with the output signal waveform on secondary winding 11-12. The output of the oscillator is applied, via lead 44, to control the switching devices of the inverter 30.

The reserve DC voltage source is applied to input terminals 15 and 16. This DC voltage may be supplied by a battery source or other suitable energy source. This DC signal is coupled, via the DC input filter 23 and leads 40 and 41, to the inverter circuit 30. The inverter circuit 30 includes power switching devices which are switched in response to the oscillator 25. The power switching devices couple this DC input signal to the primary winding 9–10.

Since the power switching devices are switched in phase with the output signal on secondary winding 11–12, it is apparent that no power is transmitted via inverter 30 and primary winding 9–10 to the secondary winding 11–12. Hence, it is apparent that during normal operation of the commercial AC input signal the total output power is supplied by the commercial AC power source alone.

The bias voltage to operate the various control circuits of the UPS is derived from the bias supply winding 7–8 coupled to the control circuit voltage supply 29. The voltage supply 29 comprises essentially a rectifier, the output of which is connected, via lead 42, to a linear regulator 27, a reference voltage source 26, and a start circuit 22. The start circuit 22 comprises a regulator circuit to supply the voltage to the reference voltage source 26 and the linear regulator 27 from the DC input voltage on input terminals 15 and 16 when the output voltage of the voltage supply 29 is low. This low output voltage normally occurs during start-up of the UPS.

A low voltage cutoff circuit 24 is shunted across the output of the DC output filter 23. This low voltage cutoff circuit 24 monitors the output voltage of the filter 23 and, during an initial transient period when the DC input voltage on leads 40 and 41 is low, it applies a signal, via lead 43, to inhibit the operation of the inverter 30. This protection is needed because at low DC energizing voltages the operation of the oscillator 25 tends to be unstable.

During brownout conditions the AC voltage applied to input terminals 13 and 14 is slightly degraded. This degradation may amount to a 15 percent or more reduction below the normal AC signal value. This degraded signal is not adequate to supply the total output load power. This degradation of the commercial AC input signal applied to input terminals 13 and 14 is detected by the low AC voltage detector 17. The low AC voltage detector 17 is designed to detect a drop of about 10 to 15 percent in the commercial AC voltage. Upon the occurrence of this degraded condition it applies a control signal, via lead 35, to the switching means 21.

The phase of the AC input signal applied to input terminals 13 and 14 is monitored by a phase detector circuit 19. The phase detector 19 generates a square wave signal in phase with the zero crossings of the AC input signal waveform. This square wave signal is applied, via lead 37, to the switching means 21. The switching means 21, in response to the control signal on lead 35, indicative of a brownout condition, couples lead 37 to lead 55. Hence, the phase control signal of phase detector 19 is applied to the oscillator 25 and the oscillator is constrained to operate in phase with the AC input signal applied to input terminals 13 and 14. The inverter, in response to the oscillator 25, switches in phase with the AC input signal.

During the brownout condition, or share mode of operation, both the AC input signal and the inverter 30 switch in phase with each other, the output power is supplied or shared equally by the commercial AC input power source and the DC input power source.

The failure mode of operation occurs when the AC signal applied to input terminals 13 and 14 decreases to a magnitude at which it is no longer able to supply output power to the load. This condition is considered to occur if the commercial AC input signal drops 25 percent or more below its normal value. This failure is detected by the AC voltage and failure detector 18 which applies a signal, via lead 36, indicative of this failure to the switching means 21. This signal decouples the switching paths in the switching means 21 and isolates the oscillator 25 from both the phase detectors 19 and 28. The oscillator 25 in this condition runs freely and drives the inverter circuit 30. In this condition all of the power is supplied to the secondary winding 11–12 from the DC input power source coupled to input terminals 15 and 16.

It is apparent from the foregoing description that the no-break UPS disclosed herein can power the output load separately from either a commercial AC power source or a DC reserve power source, or can derive a regulated output signal from both of these power sources simultaneously. These various modes of operation hence permit the no-break UPS to operate with the highest possible efficiency under all possible conditions.

Figure 2:
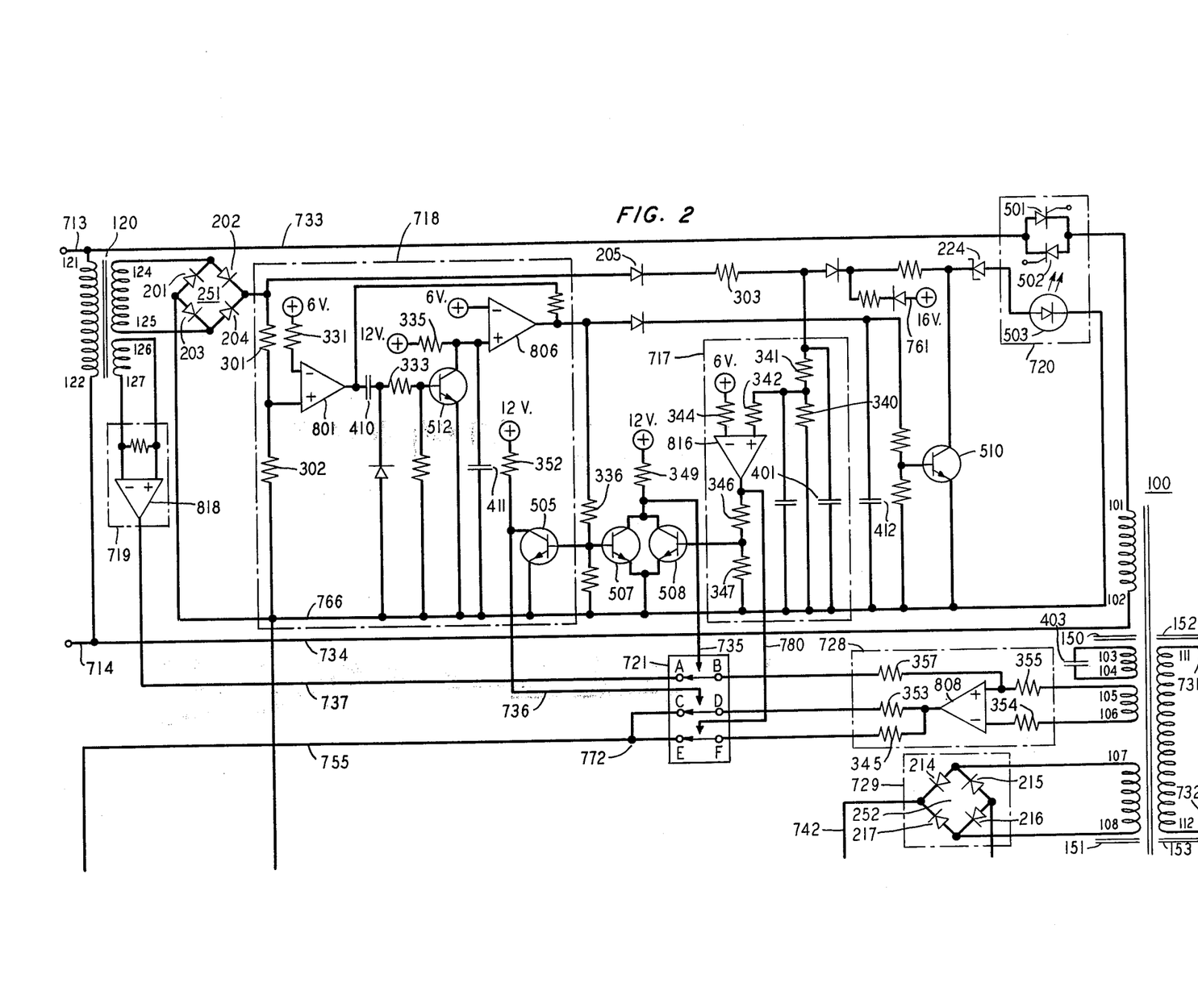
FIG. 2 and 3 together are a detailed circuit schematic of the uninterruptable power supply shown in block form in FIG. 1.
Figures 3, 4:
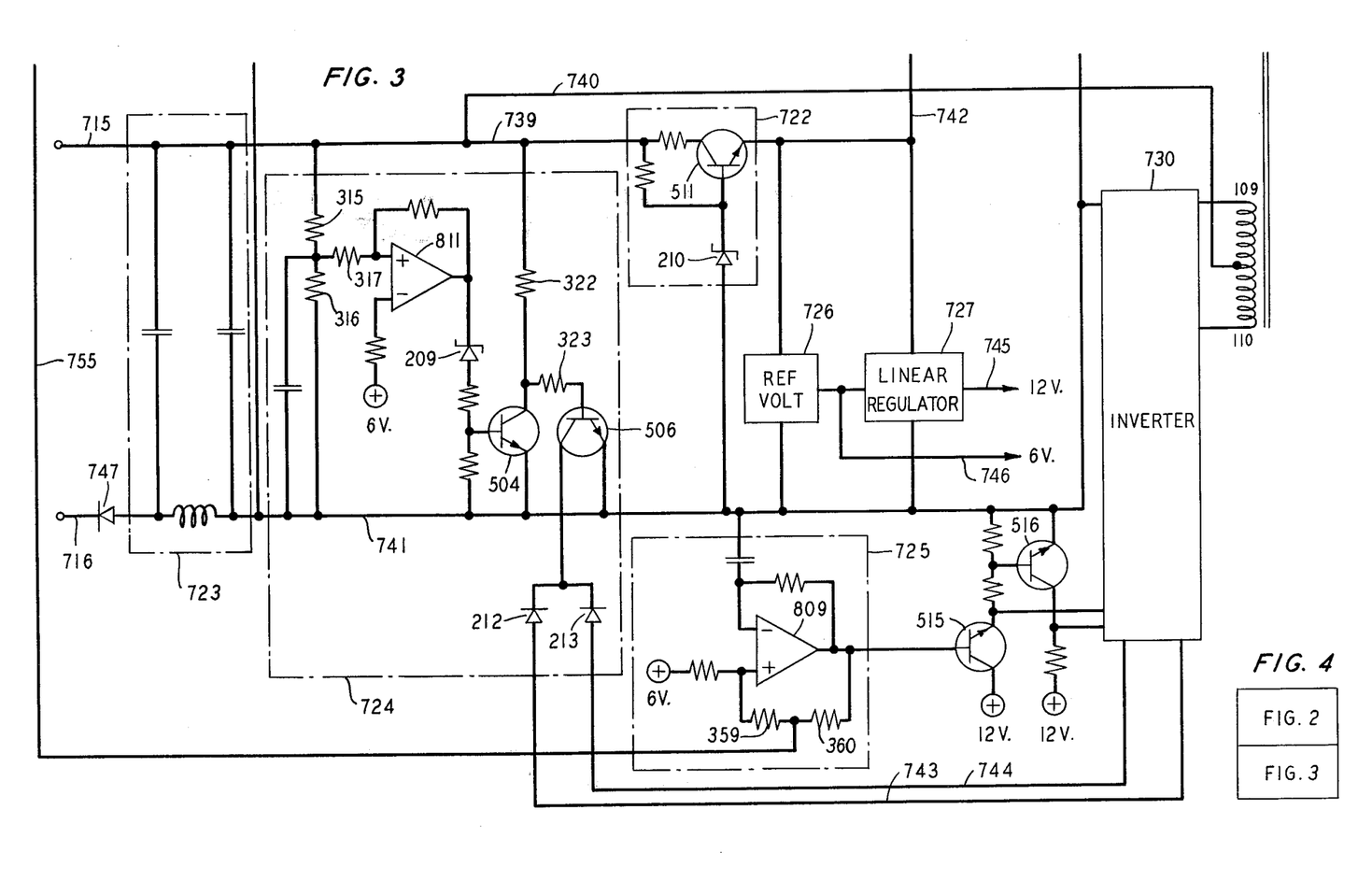
FIG. 4 shows how to combine FIG. 2 and 3.

A detailed circuit schematic of a no-break UPS embodying the principles of the invention is shown in FIG. 2 and 3 connected together as shown in the diagram of FIG. 4. The no-break UPS disclosed therein is adapted to accept an AC input signal from a commercial AC source at input terminals 713 and 714. The AC voltage in this particular example comprises a 60 Hz, 240 volt signal. The no-break UPS is also adapted to accept a DC voltage at input terminals 715 and 716. This DC voltage source may comprise any type DC reserve energy source. In the particular example disclosed herein the DC voltage source comprises a 48 volt DC voltage.

The AC input voltage applied to input terminals 713 and 714 is coupled, via leads 733 and 734, and solid state gate 720 to an AC primary winding 101–102. The DC voltage input at terminals 715 and 716 is coupled via leads 740 and 741 and an inverter 730 to a DC primary winding 109–110. The primary windings 101–102 and 109–110, together with a secondary winding 111–112, are wound on a common core of the ferroresonant transformer 100. Two output terminals 731 and 732 connect the secondary winding 111–112 to a load to be energized. A winding 103–104 wound around the core of transformer 100 is shunted by a ferrocapacitor 403 which resonates at the desired frequency to provide the ferroresonant action of the transformer 100. Winding 105–106 monitors the phase of the signal on the output winding 111–112. A winding 107–108 is utilized to derive a supply voltage from which biasing and reference voltages are derived.

High reluctance shunts 150, 151, 152, and 153 in the transformer 100 are utilized to magnetically separate the two primary windings 101–102 and 109–110 from each other while coupling each primary winding to the windings 103–104, 105–106, 107–108, and 111–112. This particular arrangement of isolating the two primary windings 101–102 and 109–110 from each other permits the two inputs on windings 101–102 and 109-110 to share the output load of the secondary winding 111-112 while at the same time minimizing the generation of circulating currents from one primary winding to another primary winding.

NORMAL OPERATION OF THE NO-BREAK UPS

The no-break UPS normally derives the signal which is supplied to the secondary winding 111-112 solely from the commercial AC input signal applied to the input terminals 713 and 714. This commercial AC input signal comprises the sole energy source as long as its magnitude exceeds 216 volts, which is 90 percent of the 240 volt nominal value used in the illustrative embodiment. This AC signal is applied via leads 733 and 734 and the solid state gate 720 to the primary winding 101-102. The solid state gate 720 comprises two parallel, inverse connected silicon controlled rectifiers 501 and 502 whose triggering gates are light responsive photon detectors. The triggering signals are provided by the light emitting diode 503 which actuates the photon detectors of the triggering gates. The energization of the light emitting diode 503 is provided by the commercial AC input signal as discussed hereinbelow.

From this input signal a regulated output signal is derived on the secondary winding 111-112. Regulation of this output signal is achieved due to the ferroresonant action of the saturating core of transformer 100 induced by the action of the ferro capacitor 403. Inasmuch as open loop ferroresonant regulation is a well-known phenomenon to those skilled in the power supply art, it is not considered necessary to describe in detail this aspect of the no-break UPS.

The magnitude of the input commercial AC signal is monitored by a transformer 120 which has a primary winding 121-122 shunting the input terminals 713 and 714. A secondary winding 124-125 of transformer 120 is connected to a bridge rectifier 251 comprising the rectifying diodes 201, 202, 203, and 204. Under normal operating conditions, the DC output voltage of this bridge rectifier has a voltage waveform of a rectified sine wave having a peak voltage of approximately 30 volts. This 30 volt rectified sine wave signal is applied, via diode 205, resistor 303, and the voltage breakdown diode 224 to a light emitting diode 503. As long as this signal's peak voltage is approximately 26–30 volts in the illustrative embodiment, the voltage breakdown diode 224 is operated in its breakdown state and transmits current to energize the light emitting diode 503. The energized light emitting diode 503 triggers the light-respective photon detectors of the silicon controlled rectifiers 501 and 502 each half-cycle to permit continuous conduction of the AC input signal to the primary winding 101-102. A backup voltage source is applied via terminal 761 to energize the light emitting diode during the brownout condition described below.

The transformer 120 also includes a secondary winding 126-127 which is connected to a phase detector 719. The phase detector 719 comprises the operational amplifier 818 which generates a square wave output whose zero crossings coincide with the zero crossings of the AC sine wave input applied to input terminals 713 and 714. This square wave output is utilized as described below to synchronize an inverter circuit 730 under certain conditions of operation.

The rectified sine wave voltage output of the rectifier 251 is applied to a voltage divider comprising resistors 301 and 302. This voltage divider is a part of the AC voltage and failure detector 718. The voltage signal at the junction of resistors 301 and 302 is applied to the noninverting input of the comparator 801. A reference voltage is applied, via resistor 331, to the inverting input. When the magnitude of the rectified sine wave, at the junction of resistors 301 and 302, exceeds the reference voltage at the inverting input, the output voltage of the comparator 801 is switched into its high voltage state. It is apparent that as long as the input Ac voltage is at its normal magnitude the output of the comparator 801 switches into its high voltage state each half-cycle. This high voltage output state of comparator 801 is applied, via capacitor 410 and resistor 333, to the base of transistor 512 which is biased, in response thereto, into its conducting state. The capacitor 411 is periodically charged by the voltage source coupled to resistor 335 during the periodic nonconducting intervals of transistors 512. The stored charge on capacitor 411 is periodically replenished during these nonconducting intervals of transistor 512. The capacitor 411, however, is periodically discharged by the conduction of transistor 512 and the voltage applied to the noninverting input of comparator 806 and the maximum voltage attained is not sufficient to switch the output thereof into its high voltage state. Hence, as long as the AC input signal is at its normal magnitude, the output of the comparator 806 is switched into its low voltage state. The low output state voltage of the comparator 806 is applied via resistor 336 to the base of transistor 505. This low voltage state allows the transistor 505 to be biased nonconducting.

With transistor 505 nonconducting, a high voltage state, which in the example herein is 12 volts, is applied via resistor 352 and lead 736 to a bilateral switch 721. The bilateral switch 721 is a semiconductor switch which includes internal circuit paths whose connections are opened or closed in response to external control voltages. A detailed description of a bilateral switch suitable for use herein may be found by reference to the above-identified reference source.

The bilateral switch 721 is disclosed herein as having three active internal circuit paths, path A-B, path C-D, and path E-F. The high voltage signal on lead 736 in response to the nonconduction of transistor 505 enables the closing of the circuit path C-D. This circuit path C-D remains closed as long as the voltage on lead 736 is high. The voltage on lead 736 remains high until the AC input on leads 713 and 714 is in its failed condition as described hereinbelow.

The rectified output on the bridge rectifier 251 is also applied, via diode 205 and resistor 303, to a voltage divider comprising the resistors 340 and 341 of the low AC voltage detector 717. The voltage at the junction of resistors 340 and 341 is applied via resistor 342 to the noninverting input of the comparator 816. With the AC input voltage at its normal operating level, the output of the comparator 816 is switched into its high voltage state. This high voltage state is applied, via lead 780, to the bilateral switch 721 and operates to close the internal circuit path E-F.

The high voltage output state of the comparator 816 is also applied, via a voltage divider comprising resistors 346 and 347, to the base of transistor 508. The transistor 508 is biased conducting in response thereto. The transistor 507, connected in parallel to transistor 508, is biased nonconducting in response to the low output voltage state of comparator 806. This applies the low voltage signal of ground lead 766 to the lead 735 which is coupled to circuit path A-B in the bilateral switch 721. The internal circuit path A-B is opened in response to the low voltage on lead 735.

As is apparent from the foregoing description, the bilateral switch includes three internal circuit paths A-B, C-D, and E-F. When the AC input signal is normal, the circuit path A-B is opened and the two circuit paths C-D and E-F are closed. The particular circuit paths closed and opened within the bilateral switch 721 determine the phase relations between the AC input signal at terminals 713 and 714, the output signal on winding 111–112, and the output signal of the inverter 730 at primary winding 109–110.

As described hereinabove, transformer 120 includes the windings 126 and 127 which are connected to the phase detector 719. The operational amplifier 818 of the phase detector 719 generates a square wave in phase with the sine wave AC voltage input to terminals 713 and 714. This square wave signal is applied, via lead 737, to internal circuit path A-B of the bilateral switch 721. As described above, during normal operation when all the output power is supplied by the commercial AC input signal, the internal circuit path A-B is in an open condition. Hence, the square wave signal in phase with the AC input on lead 737 is decoupled from the control circuitry of the no-break UPS.

The phase of the output signal on the secondary winding 111–112 is monitored by the phase detector 728 which is connected to the transformer winding 105–106. The phase detector 728 includes the operational amplifier 808 which is connected to the winding 105–106, via the resistors 354 and 355. The output of the operational amplifier 808 is a square wave whose zero crossings coincide with the zero crossings of the square wave signal on the secondary winding 111–112. Hence, the two signals are in phase coincidence. The output signal of the operational amplifier 808 is applied, via resistors 353 and 345, to the circuit paths C-D and E-F in the bilateral switch 721. These two paths are coupled at node 772 so that the resistors 353 and 345 are connected in parallel. The resistors 353 and 345 have different impedances, the resistor 345 having a substantially higher impedance than the resistor 353. The resistor 353, having the lower impedance, is decoupled from the circuit, as described below, during the transition from normal mode to the below-described share mode to limit transients during the transition period when the phase of the inverter 730 is changed.

The square wave output of the phase detector 728 is coupled, via lead 755, to an oscillator circuit 725. The oscillator circuit 725 controls the switching of the switching devices of the inverter 730. The square wave output on lead 755 is applied to the junction of resistors 359 and 360 in the feedback path of the operational amplifier 809 of the oscillator 725. The impedance of resistors 359 and 360 is equal and the applied square wave signal on lead 755 is divided equally between the noninverting input and the output of the operational amplifier 809. This applied square wave signal constrains the oscillator 725 to oscillate in phase with the signal on the secondary winding 111–112.

The output of the oscillator 725 is coupled, via the driving transistors 515 and 516, to oppositely phased switching devices of the inverter 730. The inverter 730 in the embodiment disclosed herein may comprise two oppositely phased switching devices which are coupled in the traditional push-pull configuration. To accommodate the idling mode described below, flyback diodes should shunt the switching devices. Inverters of this design are well known in the art and it is not believed necessary to described it in detail.

During the idling mode of operation, when inverter 730 switches in the phase with the signal on the secondary winding 111–112, the inverter does not consume power from the DC reserve energy source and does not transmit power to the secondary winding 111–112. The current that flows from a switching device during each one-half cycle is equal and identical to the current flowing through a flyback device. Hence, the inverter 730 does not consume any power applied to the input terminals 715 and 716 by the DC source, and neither does it deliver any power to the primary winding 109–110.

A blocking diode 747 is connected to the input terminal 716. This blocking diode is included to prevent the application of charging current to a DC voltage source coupled to input terminals 715 and 716 during the idling mode phase of the inverter 730. Blocking diode 747 is operative because the rectified DC voltage of the primary winding 109–110 during this nonpower transmission mode of operation is slightly higher than the magnitude of the DC voltage applied to input terminals 715 and 716.

The control and reference voltages to operate the various control circuits of the no-break UPS are derived from the signal developed across the transformer winding 107–108. This is coupled to a DC voltage supply 729 which comprises a bridge rectifier 252 including the rectifying diodes 214, 215, 216, and 217. A DC voltage of approximately 15 volts is derived in the embodiment disclosed herein by rectifier 252 from the square wave voltage across winding 107–108. This 15 volt DC voltage is applied via lead 742 to a linear regulator circuit 727 and a reference voltage source 726. The linear regulator 727 derives a 12 volt regulated voltage at output lead 745 which is utilized to supply bias to the various integrated control circuits. The reference voltage 726 derives a 6 volt signal at output lead 746 which is utilized by the various control circuits as a reference voltage.

SHARE MODE OF OPERATION

If the AC input voltage is degraded sufficiently so that it can no longer supply the total output power needed, but not to a point at which it cannot contribute power, the no-break UPS operates in a share mode of operation whereby both the AC input on terminals 713 and 714 and the DC input on terminals 715 and 716 contribute power to the output load of the UPS. This reduction in AC voltage which culminates in the share mode of operation is known as the brownout condition, and, in the illustrative embodiment, occurs when the AC input voltage is less than 216 volts but greater than 175 volts. This brownout condition is detected by the low AC voltage detector 717.

When the brownout condition occurs, the rectified sine wave output voltage of the rectifier 251 decreases in magnitude. This rectified sine wave voltage signal, decreased in magnitude, is applied to a voltage divider comprising the resistors 340 and 341. The voltage at the junction of resistors 340 and 341 correspondingly decreases in magnitude. This decreased voltage is applied, via resistor 342, to the noninverting input of comparator 816. The comparator 816 is biased by a reference voltage applied, via resistor 344, so that at the occurrence of the brownout condition its output switches into its low voltage state. The low voltage state output is applied, via lead 780, to the bilateral switch 721 and opens the circuit path E-F contained therein.

The low output voltage of the comparator 816 is also applied to a voltage divider comprising resistors 346 and 347. The voltage at the junction of resistors 346 and 347 biases the transistor 508 nonconducting. Transistor 507, as described above, is biased nonconducting in response to the low output voltage state of comparator 806. This permits application of the high voltage applied through resistor 349, via lead 735, to the bilateral switch 721. The high voltage signal on lead 735 closes the circuit path A-B within the bilateral switch 721.

During the share mode of operation, the circuit paths A-B and C-D are closed and the circuit path E-F is open. The phase of the AC input signal is detected by phase detector 719. A square wave signal in phase with the AC input is applied by the operational amplifier 818, via lead 737, circuit path A-B, and resistor 357 to the noninverting input of the operational amplifier 808. The square wave output of the operational amplifier 808 is now constrained to oscillate in phase with the AC input signal applied to input terminals 713 and 714. This square wave signal is applied, via resistor 353, circuit path C-D, and lead 755 to the oscillator 725 and, more specifically, to the junction of resistors 359 and 360 of the feedback network of operational amplifier 809. The output square wave of the operational amplifier 809 is therefore in phase with the commercial AC sine wave applied to input terminals 713 and 714. This signal is applied to the driver transistors 515 and 516 and from thence to the inverter circuit 730 which is constrained to switch in phase with the AC input signal.

It is apparent from the foregoing that the resistors 353 and 345 are no longer connected in parallel. The decoupling of resistor 345 from its parallel connection with resistor 353 permits the higher resistance of the resistor 353 to retard the phase change transition from oscillation of the oscillator 725 in phase with the output signal to its in-phase oscillation with the input signal. This controlled phase transition delay prevents undesirable transient signals from being supplied to the switching devices of the inverter circuit 730.

The AC voltage and failure detector 718 described hereinabove is biased so that its response to a brownout condition is the same as its response to the above-described normal condition. The output of the comparator 806 remains in its low voltage stage biasing the transistor 505 nonconducting whereby the voltage applied through resistor 352 on lead 736 continues to enable the circuit path C-D of the bilateral switch 721. The continued operation of the solid state switch 720 is assured by the voltage applied to terminal 761 which keeps the voltage breakdown diode 224 energized.

FAILURE MODE OF OPERATION

When the magnitude of the AC input voltage applied to input terminals 713 and 714 drops below 175 volts in the illustrative example, it is no longer capable of supplying useful power to the output of the UPS. This AC failure or drop in voltage may be due to a short circuit, an open circuit, or a finite fault impedance on the AC commercial power line. This reduced voltage in the AC input is immediately reflected by a reduced peak voltage of the rectified sine wave voltage output of the rectifier 251. The voltage at the junction of resistors 301 and 302 decreases accordingly. The voltage is no longer sufficient to cause the output of the comparator 801 to switch into its high voltage state. The output of comparator 801 remains in its low voltage state. This low voltage state continuously maintains the transistor 512 in its nonconducting condition. In response thereto the capacitor 411 is charged, via resistor 335, to approximately 12 volts in the illustrative embodiment. This high input voltage is applied to the comparator 806 and causes it to switch its output to the high voltage state. The high voltage output of the comparator 806 is applied via resistor 336 to bias the transistor 505 into its saturated conducting condition. Hence, the output of the AC voltage and failure detector 718 on lead 736 assumes a low voltage state.

The low voltage on lead 736 applied to the bilateral switch 721 opens the current path C-D contained within the bilateral switch 721. The conducting path E-F in the bilateral switch 721 is maintained open in response to the low AC voltage detector 717. The reduced DC voltage of rectifier 251 is applied to the low AC voltage detector 717. This voltage is coupled via a voltage divider comprising resistors 341 and 340 to the non-inverting input of comparator 816 and causes it to have a low voltage output state on lead 780 which assures that the current path E-F in the bilateral switch 721 is continued in its open state.

With both circuit paths C-D and E-F in the bilateral switch 721 in their open condition, it is apparent that the oscillator 725 is isolated from both the phase detectors 719 and 728. Hence the oscillator 725 operates in its free-running mode at approximately 60 Hz.

The low DC voltage output of the rectifier 251 is also utilized to disconnect the AC input terminals 713 and 714 from the primary winding 101–102. This disconnection is effected by disabling the solid state gate 720. The low rectified sine wave output voltage of the rectifier 251 activates the AC voltage and failure detector 718 to indicate a failure. The resulting high voltage state output of the comparator 806 biases the transistor 510 into its conducting condition. This conduction of transistor 510 shunts to reference ground on lead 766 to the breakdown diode 224. The voltage applied to diode 224 drops below its breakdown threshold and accordingly diode 224 ceases to conduct and blocks the application of energizing current to the light emitting diode 503. This disables transmission through the solid state gate 720 by eliminating the triggering light signals applied to photon detector trigger circuits of the silicon controlled rectifiers 501 and 502.

It is apparent from the foregoing that the low AC voltage detector 717 and the AC voltage failure detector 718 respond to a failed AC input by disconnecting the AC input from primary winding 101–102 and disabling all the circuit paths coupling the phase detectors 719 and 728 to the oscillator 725, and hence permit the oscillator 725 driving the inverter 730 to oscillate in a free-running mode.

When the AC input signal is restored to input terminals 713 and 714, it is necessary to resynchronize the oscillator 725 with the AC input to permit a smooth transition from one power source to another. The increase of the AC input signal is sensed by winding 124–125 on the transformer 120. The rectified sine wave voltage output of the rectifier 251 increases to its normal level. This voltage increase is applied to the voltage divider, including resistors 301 and 302. The output of comparator 801 periodically switches into its high voltage state each half-cycle. In response thereto, the output of the comparator 806 switches into its low voltage state. This low voltage signal biases the transistor 507 into its nonconducting state. The transistor 508 is also biased nonconducting by the low voltage state of the output of comparator 816. With transistors 507 and 508 nonconducting, a high voltage output signal is applied via resistor 349 and lead 735 to the bilateral switch 721. This closes the conduction path A-B and connects the output of operational amplifier 818 of the phase detector 719 to the noninverting input of the operational amplifier 808 of the phase detector 728.

The low voltage state output of the comparator 806 also biases the transistor 505 nonconducting and applies a high voltage signal on leads 736 to close the circuit path C-D within the bilateral switch 721. Hence, a square wave signal in phase with the AC sine wave input to terminals 713 and 714 is applied, via lead 755, to constrain the oscillator 725 to oscillate in phase with the AC input.

With the output of the comparator 806 in its low voltage state, the transistor 510 is again slowly biased nonconducting as capacitor 412 slowly discharges thereby permitting the application of current to break down the voltage breakdown diode 224 which in turn couples energizing current to the light emitting diode 503 in the solid state gate 720. Hence, with the light emitting diode 503 energized, the two silicon rectifiers 501 and 502 are triggered each half-cycle to transmit the AC signal to the primary winding 101-102. Depending upon the magnitude of the AC voltage applied to input terminals 713 and 714, the no-break UPS will operate in either its normal or share mode.

SPECIAL FEATURES

Due to the inherent nature of the integrated solid state control circuits and oscillators, the performance and operation of these circuits tend to be unpredictable if energized by low voltages. For example, a low voltage at the DC inputs 715 and 716 and at winding 107-108 can cause the control circuits and oscillator to operate erratically which in turn can damage the switching devices in the inverter 730. Since the voltage across winding 107-108 is low at startup, the control voltages are initially derived from the DC input at terminals 715 and 716 until the voltage across winding 107-108 reaches a minimum level. The DC input at terminal 715 is applied, via lead 739, to a series regulating start circuit 722 which includes a series regulating transistor 511 and a reference voltage diode 210. This linear regulator operates in response to the applied voltage to produce a regulated 15 volt signal at the emitter of transistor 511. This 15 volt signal is applied to the reference voltage source 726 and the linear regulator 727 from which the 6 volt reference and 12 volt control voltages are derived, respectively. When the voltage on winding 107-108 achieves operating status, the DC voltage output of the rectifier 252 on lead 742 backbiases the transistor 511 and subsequently the control voltages are derived from the DC supply voltage source 729.

The input terminals 715 and 716 are coupled to the inverter 730 by a DC filter 723 and a low voltage cutoff circuit 724. The low voltage cutoff circuit 724 includes a voltage divider comprising resistors 315 and 316 shunting the DC input filter 723. The filtered input DC voltage is applied via the junction of resistors 315 and 316 and the resistor 317 to the noninverting input of comparator 811. At low input DC voltages, which in the present example is less than 40 volts, the output of the comparator 811 assumes a low voltage state. This low voltage is not sufficient to break down the voltage breakdown diode 209 and the transistor 504 is biased nonconducting. Hence, the DC input on lead 739, coupled via resistors 322 and 323, is sufficient to bias the transistor 506 into its conducting state. With transistor 506 conducting, the two diodes 212 and 213 connected in parallel to its collector are forwardbiased. The anodes of diodes 212 and 213 are connected via the two leads 743 and 744 to clamping circuits within the inverter 730 which operate to inhibit the operation of the switching devices contained therein.

As long as the diodes 212 and 213 are forwardbiased, operation of the inverter 730 is inhibited. In the instant example, as soon as the DC input voltage applied to terminals 715 and 716 exceeds 40 volts, the output of the comparator 811 switches into its high voltage state. The high voltage state output is sufficient to break down the voltage breakdown voltage 209 and applies a voltage sufficient to bias the transistor 504 and its saturated conducting state. The conducting transistor 504 diverts biasing current from the base of transistor 506 and hence the transistor 506 is cut off. The diodes 212 and 213 are now backbiased and the inverter 730 is enabled to operate its switching devices normally in response to the oscillator 725 and deliver power to the load.

What is claimed is:

1. An uninterruptible power supply comprising a power transformer including a first primary winding, a second primary winding, and a secondary winding,
    signal sensing means coupled to said first primary winding and responsive to detect a signal amplitude below a desired normal amplitude threshold,
    generating means to generate a periodic power signal and being coupled to said second primary winding,
    power flow control means to selectively control power transfer from said first and second primary windings to said secondary winding including
    first phase detection means to monitor a signal phase of said secondary winding,
    phase control means coupled to said first phase detection means and to said generating means and normally operative to align the phase of said periodic signal with said signal phase of said secondary winding,
    second phase detection means to monitor a signal phase of said first primary winding,
    said phase control means coupled to said second phase detection means and to said signal sensing means and operative in response to a signal amplitude below a desired normal amplitude detected by said signal sensing means to align the phase of said periodic signal with a signal of said first primary winding.

2. An uninterruptible power supply as defined in claim 1 wherein said first phase detection means comprises a phase detector winding coupled to said power transformer and said phase control means comprises a switching type signal transmission arrangement normally connected to transmit a signal on said phase detection winding to said generating means to control the phase therein.

3. An uninterruptible power supply as defined in claim 2 wherein said switching type signal transmission arrangement is responsive to said signal sensing means upon the occurrence of a signal amplitude below a desired normal amplitude threshold to couple a signal of said second phase detection means to said generating means to control the phase therein to coincide with a phase of a signal monitored by said second phase detection means.

4. An uninterruptible power supply as defined in claim 1 and further including second signal sensing means to detect a signal failure at said first primary winding, said phase control means operative in response to said second signal sensing means to disconnect from said generating means whereby said generating means runs freely without phase control.

5. An uninterruptible power supply as defined in claim 4 and further including gating means responsive to said second signal sensing means to disable power flow into said first primary winding from said secondary winding.

6. A no-break reserve energy system comprising, signal processing means including first and second input means and output means, isolation means to minimize circulating currents between said first and second input means, first sensing means to detect a first signal magnitude threshold at said first input, second sensing means to detect a second signal magnitude threshold at said first input less than said first signal magnitude threshold, third sensing means to monitor a signal phase at said first input means, fourth sensing means to monitor a signal phase at said output means, phase control means to control the signal phase at said second input to coincide with the signal phase detected by one of said third and fourth sensing means, control selection means responsive to said first and second sensing means to selectively couple said third and fourth sensing means to said phase control means when signals at said first input are between said first and second signal magnitude threshold and when said signals exceed said first threshold, respectively.

7. A no-break reserve energy system as defined in claim 6 including, inverter means coupled to said second input means, said phase control means including a source of periodic signals coupled to drive said inverter means, said source of periodic signals including phase adjustment means, said control selection means including switching path means responsive to said first and second sensing means to selectively couple said third and fourth sensing means to said phase adjustment means.

8. A no-break reserve energy system as defined in claim 7 wherein, said source of periodic signals includes operational amplifier means, and said phase adjustment means includes a voltage divider including two equal impedances connected in series and connected to couple the output and the noninverting input of said operational amplifier means, a junction of said two equal impedances being coupled to the output of said switching path means.

9. A no-break reserve energy system as defined in claim 6 wherein said signal processing means includes a transformer and said isolation means includes high reluctance shunts between said first and second input means.

10. A no-break reserve energy system as defined in claim 6 wherein said first sensing means further includes, means to detect a signal failure at said first input means, and means responsive to said means to detect a signal failure to disable said control selection means wherein the signal phase at said second input becomes uncontrolled.

11. A no-break reserve energy reserve system as defined in claim 10 further including, signal gating means connected to said first input means, said signal gating means being opened in response to said means to detect a signal failure.

12. An uninterruptable power supply comprising, a ferroresonant transformer having a regulated output, first and second inputs connected to said transformer, said first input adapted to accept a commercial AC line signal, said second input adapted to accept a DC voltage energized static inverter circuit, phase control means including line signal phase detection means to detect the phase of said AC signal, signal magnitude monitoring means to monitor the magnitude of said AC signal, and output signal phase detection means to detect the phase of said regulated output, said phase control means constraining said static inverter to run in phase with said regulated output in response to said signal monitoring means if the magnitude of the AC signal is normal, wherein the AC signal supplies the output power and said phase control means constraining said static inverter to operate in phase with the AC line signal with the magnitude of the AC signal at a lower than normal value wherein the static inverter and AC line both share to contribute to said regulated output.

13. An uninterruptable power supply as defined in claim 12 wherein said signal monitoring means includes first magnitude sensing means to detect normal and failed conditions of the AC signal and second magnitude sensing means to detect signal values between said normal and failed condition of the AC signal, a source of periodic signals to drive said inverter means including phase adjustment means, switching path means to couple said line signal and output signal phase detecting means to said phase adjustment means, said switching path means responsive to said first and second magnitude sensing means wherein the output signal phase detection means is coupled to said phase adjustment means at a normal AC signal magnitude, the line signal phase detection means is coupled to said phase adjustment means at a lower than normal AC signal magnitude, and said line signal and output signal phase detection means is disconnected from said phase adjustment means at a failed AC signal magnitude.

14. An uninterruptable power supply as defined in claim 13, including gating means connected to said first input and responsive to said first magnitude sensing means to disconnect said AC line signal from said first input at a failed AC signal magnitude.

15. An uninterruptable power supply as defined in claim 13 wherein, said output signal phase detection means is coupled by a first and second impedance to a first and second parallel path in said switching means, said first impedance being substantially greater than said second impedance, and means responsive to said second magnitude sensing means to disable said second path wherein the output impedance of the output signal phase detection means is increased, and means responsive to said second magnitude sensing means to couple the output of said line signal phase detection means to the input of said output signal phase detection means to constrain it to operate in phase with said line signal phase detection means.

16. An uninterruptable power supply comprising, first means to accept an AC primary source of energy, second means to accept a DC reserve source of energy, output means, signal processing means to couple said first and second means to accept to said output means, said means to couple including means to isolate said first and second means to accept from each other, inverter means to generate an AC signal coupled to interconnect said second means to accept to said signal processing means, said inverter means being responsive to derive AC signals from a DC reserve source of energy, magnitude monitoring means to monitor the magnitude of an AC signal applied to said first means to accept for a normal level, a brownout level, and a failed level, first phase detection means to detect the phase of a signal at said output means, second phase detection means to detect the phase of a signal at said first means to accept, means responsive to said magnitude monitoring means to constrain said inverter means to operate in phase with a signal phase detected by said first phase detection means at a normal level, and operate in phase with a signal detected by said second phase detection means at a brownout level, and to operate independently of said first and second phase detection means at a failed level.

17. An uninterruptable power supply as defined in claim 16 wherein, said signal processing means comprises a ferroresonant transformer including first and second primary windings coupled to said first and second means to accept, respectively, said output means comprising a secondary winding, said first primary winding, said secondary winding, and said second primary winding being wound on a common core in that order, and said means to isolate comprising first and second high reluctance shunts positioned between said first primary winding and said secondary winding and between said second primary winding and said secondary winding, respectively.

18. An uninterruptable power supply as defined in claim 16 wherein, said means to constrain said inverter means includes signal generating means to generate a periodic signal including phase adjustment means, said means to constrain comprising switching path means to selectively couple and decouple said first and second phase detection means to said phase adjustment means, said switching path means being responsive to said magnitude monitoring means.

19. An uninterruptable power supply as defined in claim 18 wherein, said signal generating means comprises an operational amplifier means, and said phase adjustment means includes first and second impedances connected in series and coupling an output of said operational amplifier means to one of its inputs, said first and second phase detection means being coupled via said switching path means to a junction of said first and second impedances.

20. A no-break uninterruptable power supply system comprising, a transformer including a saturating core, first and second primary windings, a secondary winding, a ferroresonant winding and a phase monitoring winding, controlled gating means connected to said first primary winding, means to accept an AC signal source connected to said gating means, an inverter circuit connected to said second primary winding, means to accept a DC signal source connected to said inverter circuit, first phase detection means coupled to said phase monitoring winding, second phase detection means coupled to said means to accept an AC signal, signal magnitude monitoring means connected to said means to accept an AC signal responsive to a normal, brownout, and failed magnitude of said AC signal, oscillating means having a phase adjustment circuit and connected to drive said inverter circuit, means to selectively couple said first and second phase detection means to said phase adjustment circuit, said means to selectively couple being responsive to said signal magnitude monitoring means to couple said first phase detection means to said phase adjustment circuit at a normal magnitude of said AC signal and couple said second phase detection means to said phase adjustment circuit at a brownout magnitude of said AC signal.

21. A no-break uninterruptable power supply system as defined in claim 20 wherein, said transformer includes first high reluctance shunts between said first primary winding and said secondary winding, and second high reluctance shunts between said second primary winding and said secondary winding.

22. A no-break uninterruptable power supply system as defined in claim 21 wherein, said transformer includes a bias voltage supply winding, rectifier means to derive a DC signal from said bias voltage supply winding, a voltage regulator coupled to said means to accept a DC source, linear regulator means to derive bias signals coupled to said rectifier means and said voltage regulator, and means responsive to a signal magnitude at an output of said rectifier means to selectively render said voltage regulator active or inactive depending upon said signal magnitude at an output of said rectifier means.

23. A no-break uninterruptable power supply system as defined in claim 20 further including, inhibit means to inhibit the operation of said inverter circuit, low voltage detection means coupled to said means to accept a DC signal source and adapted to detect a voltage drop below a reliable operating threshold, said inhibit means responsive to said low voltage detection means to inhibit inverter operation at DC voltage below said reliable threshold.

24. A no-break uninterruptable power supply system as defined in claim 20 wherein, said controlled gating means comprise first and second switching devices connected in an inverse parallel fashion, and means coupled to said means to accept an AC signal and responsive to an AC signal thereon to generate triggering signals to activate said first and second switching devices.

* * * * *